UNITED STATES PATENT OFFICE.

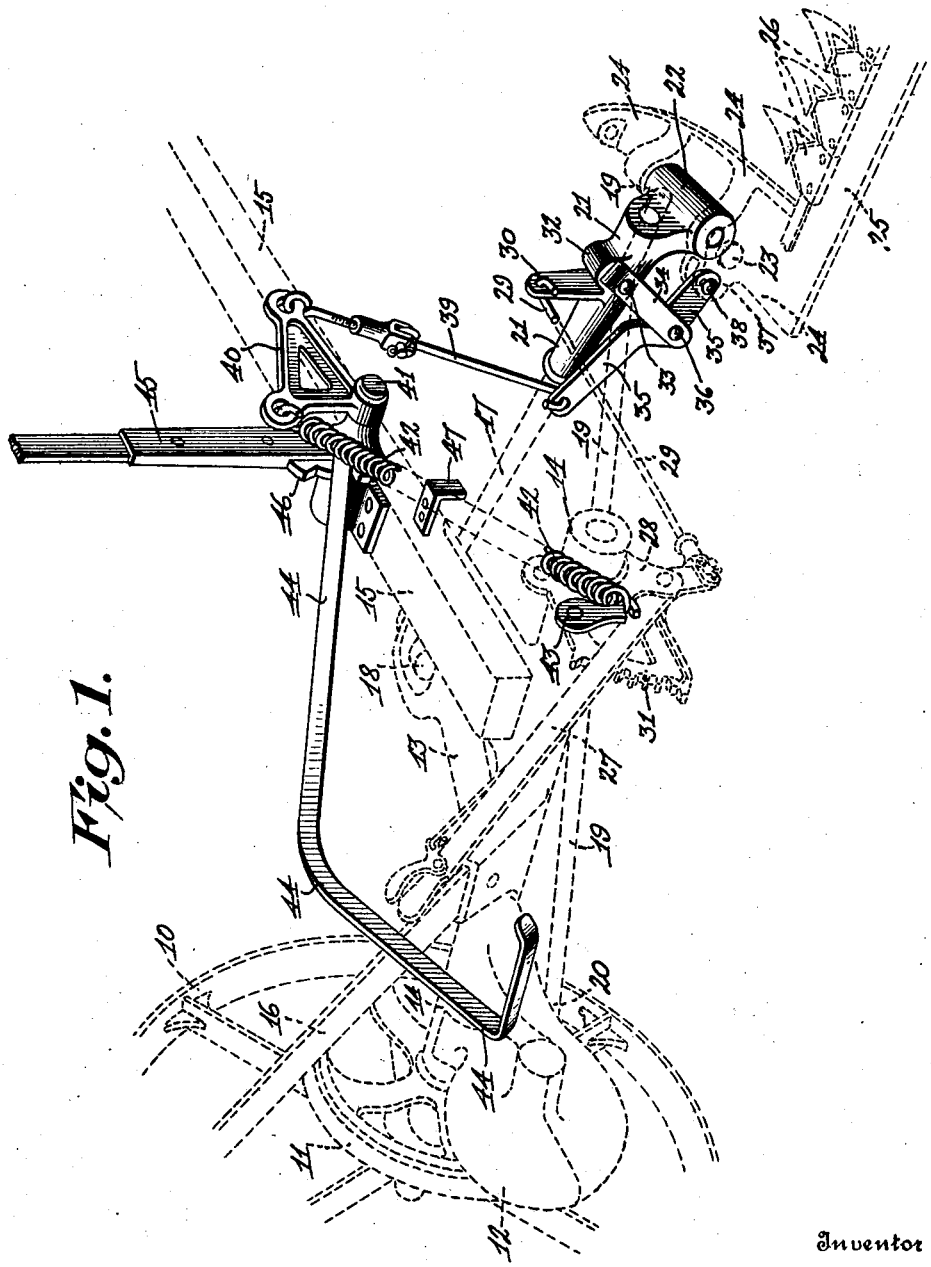

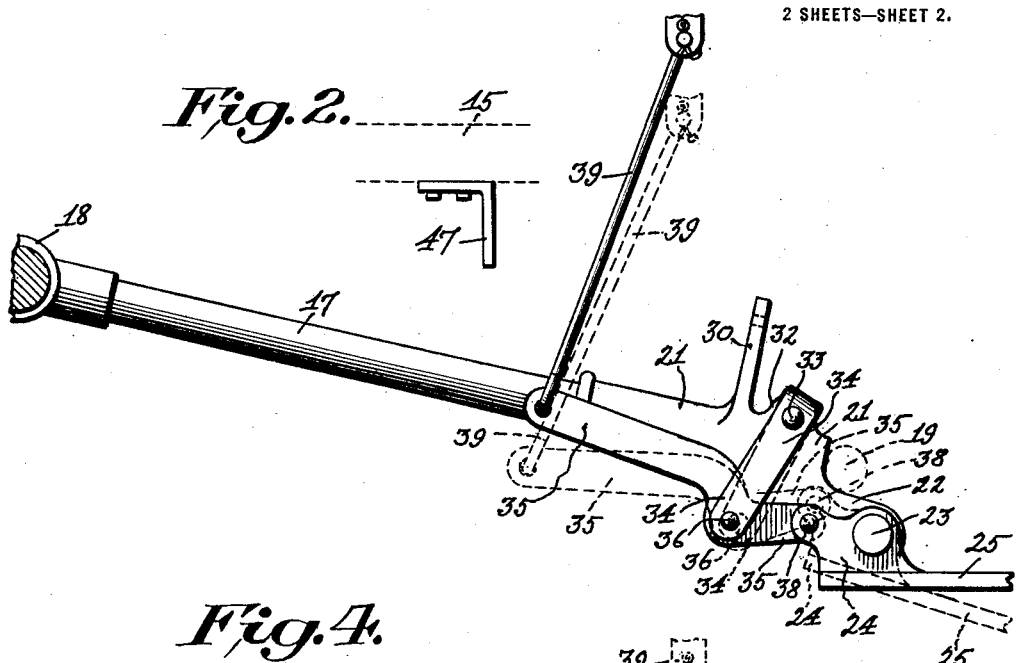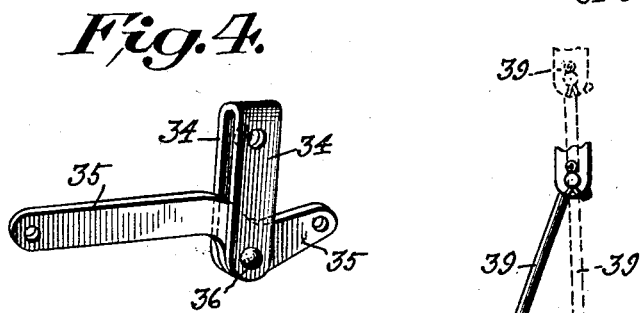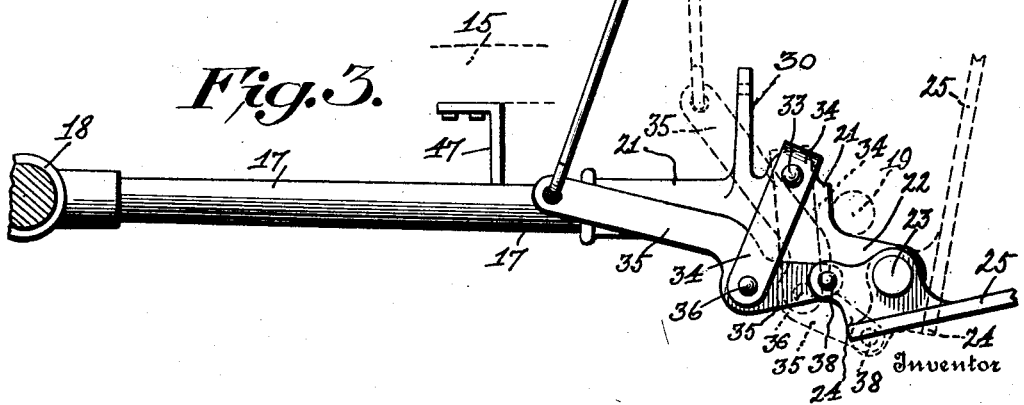

SANFORD L. CLUETT, OF HOOSICK FALLS, NEW YORK.

MOWER.

1,323,388.                     Specification of Letters Patent.        Patented Dec. 2, 1919.

Application filed February 17, 1919. Serial No. 277,457.

*To all whom it may concern:*

Be it known that I, SANFORD L. CLUETT, a citizen of the United States, residing at Hoosick Falls, in the county of Rensselaer and State of New York, have invented certain new and useful Improvements in Mowers, of which the following is a specification.

My invention relates to a mower and more particularly to a mechanism for gagging, raising and tilting the cutter bar of the mower.

The objects of my invention are:—

First, to construct a mechanism of the character referred to in which the cutter bar is so hinged, movable and adjustable that not only its outer end but also the inner end or main shoe will droop into hollows or depressions of the ground without in any way disturbing the normal position and efficient operation of the mower.

Second, to construct a mower in which the cutter bar as a whole will raise or lower according to the contour of the surface of the ground over which said bar is passing and insure that the cutting knives will be at all times as near as possible to the ground, thereby constantly cutting the grass not only evenly but at the lowest height.

Third, to construct a mower in which the cutter bar mechanism for gagging, raising and tilting is so simple and direct and with so few points for friction that a greater part of the weight of the cutter bar and connecting hinged frame is transferred to the wheels, thus giving additional traction with resultant augmented driving power for the cutting knives without in any way impairing the efficiency of the cutter bar, which by its movements is following the contour of the surface of the ground.

Fourth, to construct and arrange a mower provided with a gagging, raising and tilting mechanism so that the floating gag lever, the swinging link and fulcrum supporting said gag lever, the pivoted points or connections of said swinging link with the hanger and floating gag lever and said floating gag lever with the lifter rod or link and cutter bar and movements of said parts are substantially in a single vertical plane normal to the longitudinal axis of the mower, thereby effecting a means in which all the resultant and coöperating forces acting during the manual lifting and lowering of the cutter bar or automatic adjustment of said cutter bar during the cutting operations of the mower are capable of being carried out directly with a minimum of friction and movement of said parts.

Fifth, to construct a mower in which all the purposes and objects given above are fully carried out and at the same time said bar may be easily and quickly raised at the will of the operator by hand or foot power some six or eight inches from the ground at the inner end and some two feet or less at its outer end.

Sixth, to construct a mechanism of the character referred to and capable of efficiently carrying out all the purposes and results described with a minimum number of simplest parts, said parts capable of being manufactured at a low cost, easily assembled or disconnected or repaired.

Seventh, other objects and advantages of the invention will appear from the detailed description of the construction, relation and operation of the mechanism to be presently given.

The invention consists of structural characteristics and relative arrangements of elements which will be hereinafter more fully described and particularly pointed out in the appended claims.

In the two sheets of drawings in which similar reference characters indicate the same parts in the several figures,—

Figure 1 is a perspective view of a portion of a mower showing in full lines the cutter bar lifting mechanism when in its normal position.

Fig. 2 is a fragmentary and enlarged rear view of the cutter bar lifting mechanism, when in normal horizontal position in full lines, and the position said mechanism assumes when the cutter bar is drooped as indicated in dotted lines.

Fig. 3 is a similar view as Fig. 2 showing in full lines the position the cutter bar lifting mechanism takes when raised against the stop on main frame, and the dotted lines the position assumed when the cutter bar is elevated to approximately a vertical position, and Fig. 4 is a detached and perspective view of the floating gag lever and swinging link or fulcrum.

In the drawings, 10 is one of the driving wheels; 11 the driving gear, 12 the gear case, 13 the main frame provided with the sleeve 14 containing the driving shaft, not shown. Attached to said frame 13 is the usual tongue 15 and seat post 16, said parts referred to being of the usual construction and forming no part of the present invention.

17 is a drag bar hinged at 18 to said frame 13, the outer end of said drag bar being connected to push bar 19 which bar 19 as usual is also pivotally connected at its other end 20 to said frame 13, said push bar 19 and drag bar 17 forming a triangular-shaped frame with its base pivoted to the main frame 13.

On the outer and free end of the drag bar 17 is rotatably supported or carried a hanger 21, having an outer perforated lug 22 adapted to receive pin 23 which is capable of pivotally supporting and carrying a shoe 24 to which is rigidly secured a cutter bar 25, having knives 26 as shown in dotted lines.

27 is a lever pivoted to a lug 28 on the sleeve 14 and is so arranged as to be pivotally connected by means of a connecting rod 29 to an upright extension or lug 30, preferably cast integral on the upper side of the hanger 21, said lever 27 coöperating with a quadrant 31, on the sleeve 14 or frame of the mower, thereby enabling the hanger 21 to be easily oscillated or partially rotated in either direction on the end of the drag bar 17, to properly adjust the angular positions or plane of the cutter or finger bar 25 as a whole with respect to the inclination of the ground, and when so correctly adjusted to lock the same in position by means of the quadrant 31 as is common in this class of machines.

Pivotally supported in a lug 32 on the oscillatory hanger 21 by means of pin 33, is a supporting link 34 adapted to form a swinging fulcrum at its end, said link 34 being preferably double and U-shaped as shown in Fig. 4. 35 is a floating gag lever pivotally supported intermediate its ends between the separated and free ends of the link 34 by a pin 36 and having one of its ends hinged to suitable spaced lugs 37 on the inner side or edge of the shoe 24, by means of a pin 38, as clearly illustrated in Fig. 1. The other end of the floating gag lever 35, is pivotally attached by means of an adjustable lifter rod or link 39 to one arm of a bell crank 40 pivotally supported by means of a pin 41, rigidly attached to a fixed part of the mower frame, or preferably to the tongue 15 as shown. The other arm of the bell crank 40 is connected by means of a yielding and balancing spring 42 with a rigid portion of the mower frame 13 or sleeve 14 or to a hook 43 attached to the quadrant 31 as shown in Fig. 1, in such a manner as to be disposed in a plane with the plane of the bell crank for the purpose of permitting it to normally act through said bell crank 40, link 39, floating gag lever 35, link 34, and hanger 21 to transfer at all times a greater part of the weight of the same and that of the cutter bar 25, drag bar 17 and push bar 19 to the wheels of the mower for the purposes of increasing the traction and hence the cutting power of the mower knives 26.

44 is a foot lever and 45 a hand lever which are likewise pivotally supported by pin 41 and connected to the bell crank 40 in such a manner that foot or hand power can be separately or both simultaneously transmitted in rocking the bell crank 40 to operate the cutter bar lifting mechanism through its phases of movement to be presently disclosed. 46 is a quadrant coöperating with the hand lever 45 for locking the same in different positions when so desired, and 47 indicates a stop on the frame, or tongue 15 against which the drag bar 17 of the triangular-shaped hinged frame abuts when the cutter bar lifting mechanism is operated to elevate the same.

The operation of the invention is as follows:—

Assuming the parts to be in the normal horizontal position on the ground as shown in Fig. 1, and in full lines in Fig. 2, and it is desired to lift the cutter bar 25, the hand lever 45 is pulled toward the operator, said lever by means of the connected bell crank 40, and link 39, exerts an upward pull on one end, namely, the inner end of the floating gag lever 35, which pull is transmitted to the supporting link 34 through the pins 36 and 33 to the hanger 21 and outer or free ends of the drag and push bars 17 and 19, which causes said bars 17 and 19 with the cutter bar 25 to be raised until the upward movement of said drag bar 17 is arrested by coming in contact with the stop 47, and the different elements of the cutter bar lifting mechanism will assume the positions indicated in full lines in Fig. 3, with the cutter bar 25 having a small upward angle with the horizontal.

With the upward movement of the drag bar 17 stopped and the position of the pin 33 on which the supporting U-shaped link 34 pivots being now fixed, on further application of the same effort of the operator to the hand lever 45, the lower pin 36 or floating fulcrum end of the supporting link 34 passes from the inner side of a vertical line dropped from the center of pin 33, to the outer side of said line, and during this phase of movement the inner portion of the floating gag lever 35 passes between the two arms of the U-shaped link 34 and comes in contact with the pin 33 as clearly shown by dotted lines in Fig. 3, and in this position said pin 33 also acts as a stop, and prevents the cutter bar 25, which has been raised almost to a vertical position, as indicated by dotted lines in Fig. 3, during this last described movement of the floating gag lever 35, link 34 and pin 36, from moving too far inwardly and beyond the vertical and hence unable to automatically fall back to its normal cutting position, as shown by full lines in Figs. 1 and 2.

The action of the floating gag lever 35, swinging link 34 and fulcrum pin 36, throughout the operations and phases of movement described is such that an almost equal pressure on hand lever or uniform effort of the operator is required to raise the cutter bar 25 throughout its entire cycle of movement. Furthermore, it will also be seen that when the cutter bar 25 approaches the vertical position, the motion of the upper end of the floating gag lever 35 is nearly in a horizontal plane and the lower end of the link 34 or fulcrum pin 36, gradually approaches a line connecting the pivot pin 33 of the link 34 and the pin 38 connecting the floating gag lever 35 with the cutter bar 34, thereby partially forming a toggle joint to such an extent that the cutter bar 25 is maintained very rigidly in a vertical position with little pull on the lifter rod or link 39, and hence when the cutter bar 25 has been raised to an approximately vertical position as shown by dotted lines in Fig. 3, if the lifter rod or link 39 is depressed or lowered through hand lever 45, or otherwise, the removal of the upward pull or sustaining force exerted by lifter rod 39, allows said toggle joint to unlock and the cutter bar 25 is permitted to unfold or lower to the position shown by dotted lines in Fig. 3, and then as the lifter rod 39 continues in its downward path, both the cutter bar 25 and the drag and push bars 17 and 19 return to their normal positions as shown in full lines in Figs. 1 and 2.

The dotted lines in Fig. 2 indicate the positions the hanger 21, floating gag lever 35, supporting link 34 and movable fulcrum pin 36 assume when the cutter bar 25 is drooped while cutting over a depression or hole in the ground or on the downwardly inclined side of a hill.

From the foregoing disclosure of the construction, and arrangement of the parts and their coöperation it will be seen that all the objects and advantages recited in the statement of invention have been fully carried out and accomplished with the simplest possible mechanism consisting of but two essential parts, namely, a floating gag lever and a swinging or oscillating member providing a movable support or fulcrum for said floating gag lever.

What I claim is:—

1. In a mower, the combination of a machine frame, a movable frame hinged to said frame, a hanger supported on the free end of said movable frame, a cutter bar hinged to said hanger, a supporting link having one end pivotally connected to said hanger and its other end forming a swinging fulcrum, a floating gag lever pivotally connected between its ends to the swinging fulcrum end of said supporting link and having one of its ends connected with said cutter bar, and means connected to the other end of the floating gag lever for rocking it on the swinging fulcrum of the supporting link and oscillating said supporting link on its pivotal support.

2. In a mower, the combination of a machine frame, a drag bar and a push bar pivoted to said frame, a hanger rotatably supported on the free end of said drag bar, a cutter bar hinged to said hanger, a supporting link having one end pivotally connected to said hanger and its other end forming a swinging fulcrum, a floating gag lever pivotally connected between its ends to the swinging fulcrum end of said supporting link and having one of its ends connected with said cutter bar, and means connected to the other end of the floating gag lever for rocking it on the swinging fulcrum of the supporting link and oscillating said supporting link on its pivotal support.

3. In a mower, the combination of a machine frame, drag and push bars pivoted to said frame, a hanger rotatably supported on the free ends of said bars, a cutter bar hinged to said hanger, a supporting link having one end pivotally connected to said hanger and its other end forming a swinging fulcrum, a floating gag lever pivotally connected between its ends to the swinging fulcrum end of said supporting link and having one of its ends pivotally connected with said cutter bar, and means connected to the other end of the floating gag lever for simultaneously rocking it on the swinging fulcrum of the supporting link and oscillating said supporting link on its pivotal support.

4. In a mower, the combination of a machine frame, a drag bar and a push bar pivoted to said frame, a hanger rotatably supported on the free end of said drag bar, a cutter bar hinged to said hanger, a pivot pin on said hanger, a supporting link having one end pivotally attached to said pivot pin and its other end forming a swinging fulcrum, a floating gag lever pivotally connected between its ends to the swinging fulcrum end of said supporting link and having one of its ends connected with said cutter bar and its other end adapted to come in contact with said pivot pin, and means connected to the floating gag lever for rocking it on the swinging fulcrum of the supporting link and oscillating said supporting link on the pivot pin.

5. In a mower, the combination of a machine frame, a movable frame hinged to said frame, a hanger supported on the free end of said movable frame, a cutter bar hinged to said hanger, a supporting link having one end pivotally connected to said hanger and its other end forming a swinging fulcrum, a floating gag lever pivotally connected between its ends to the swinging fulcrum end of said supporting link and having one of its ends connected with said cutter bar, said supporting link with its swinging fulcrum end and floating gag lever, and connections of said floating gag lever with said cutter bar and supporting link, being substantially in a single vertical plane normal to the longitudinal axis of the mower.

6. In a mower, the combination of a machine frame, a drag bar having one of its ends pivoted to said frame, a hanger supported on the free end of said drag bar, a cutter bar hinged to said hanger, a supporting link having its upper end pivotally connected to said hanger and its lower end forming a swinging fulcrum, a floating gag lever pivotally connected between its ends to the lower swinging fulcrum end of said supporting link and having its outer end attached to said cutter bar, and means connected to the inner end of the floating gag lever for rocking said gag lever on the fulcrum end of said link and oscillate said supporting link on its pivotal connection with said hanger.

7. In a mower, the combination of a machine frame, a drag bar having one of its ends pivoted to said frame, a hanger rotatably supported on the free end of said drag bar, means for oscillating said hanger on said drag bar, a cutter bar hinged to said hanger, a supporting link having its upper end pivotally connected to said hanger and its lower end forming a swinging fulcrum, a floating gag lever pivotally connected between its ends to the swinging fulcrum end of said supporting link and having its outer end attached to said cutter bar, and means connected to the inner end of the floating gag lever for rocking said gag lever on the swinging fulcrum end of said link and oscillate said supporting link on its pivotal connection with said hanger.

8. In a mower, the combination of a machine frame, a movable frame hinged to said frame, a stop on said machine frame, a hanger supported on the free end of said movable frame, a cutter bar hinged to said hanger, a supporting link having one end pivotally connected to said hanger and its other end forming a swinging fulcrum, a floating gag lever pivotally connected between its ends to the swinging fulcrum end of said supporting link and having one of its ends connected with said cutter bar, and means connected to the other end of the floating gag lever for raising said movable frame against said stop and rocking said gag lever on the swinging fulcrum end of the supporting link and oscillating said supporting link on its pivotal connection.

9. In a mower, the combination of a machine frame, a drag bar having one of its ends pivoted to said frame, a stop on said machine frame, a hanger supported on the free end of said drag bar and adapted to come in contact with said stop, a cutter bar hinged to said hanger, a supporting link having its upper end pivotally connected to said hanger and its lower end forming a swinging fulcrum, a floating gag lever pivotally connected between its ends to the lower swinging fulcrum end of said supporting link and having its outer end attached to said cutter bar, and means connected to the inner end of the floating gag lever to abut the drag bar against said stop and rock said gag lever on the fulcrum end of said link and oscillate said supporting link on its pivotal connection with said hanger.

In testimony whereof I affix my signature.

SANFORD L. CLUETT.